(12) United States Patent
Walker, Jr. et al.

(10) Patent No.: US 7,257,303 B2
(45) Date of Patent: Aug. 14, 2007

(54) COATED OPTICAL FIBER AND FIBER OPTIC DEVICE HAVING SAME

(75) Inventors: Christopher B. Walker, Jr., St. Paul, MN (US); D. Scott Thompson, Woodbury, MN (US); Dora M. Paolucci, Austin, TX (US); John T. Brady, White Bear Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/456,153

(22) Filed: Jul. 7, 2006

(65) Prior Publication Data

US 2006/0269202 A1 Nov. 30, 2006

Related U.S. Application Data

(62) Division of application No. 10/386,849, filed on Mar. 11, 2003.

(51) Int. Cl.
 *G02B 6/036* (2006.01)
(52) U.S. Cl. ..................................... 385/128
(58) Field of Classification Search .................. None
 See application file for complete search history.

(56) References Cited

U.S. PATENT DOCUMENTS

| | | | |
|---|---|---|---|
| 3,986,997 A | 10/1976 | Clark | |
| 4,064,027 A | 12/1977 | Gant | |
| 4,191,670 A | 3/1980 | Strauch et al. | |
| 4,275,118 A | 6/1981 | Baney et al. | |
| 4,835,057 A | 5/1989 | Bagley et al. | |
| 4,882,398 A | 11/1989 | Mbah | |
| 4,909,852 A | 3/1990 | Atkinson | |
| 4,946,874 A | 8/1990 | Lee et al. | |
| 4,962,067 A | 10/1990 | Myers | |
| 5,052,779 A | 10/1991 | Honjo et al. | |
| 5,169,879 A | 12/1992 | Lee et al. | |
| 5,190,804 A | 3/1993 | Seto et al. | |
| 5,290,354 A | 3/1994 | Haluska | |
| 5,620,495 A | 4/1997 | Aspell et al. | |
| 5,773,486 A | 6/1998 | Chandross et al. | |
| 5,789,476 A | 8/1998 | Iryo et al. | |
| 6,093,676 A | 7/2000 | Heller et al. | |
| 6,150,546 A | 11/2000 | Butts | |
| 6,222,973 B1 | 4/2001 | Starodubov | |
| 6,240,224 B1 | 5/2001 | Reekie et al. | |
| 6,355,189 B1 | 3/2002 | Basil et al. | |
| 6,599,635 B1 | 7/2003 | Mechtel et al. | |
| 6,635,735 B1 | 10/2003 | Zhang et al. | |
| 2002/0004544 A1 | 1/2002 | Kolb et al. | |
| 2002/0011182 A1 | 1/2002 | Matsuda et al. | |

FOREIGN PATENT DOCUMENTS

| | | |
|---|---|---|
| EP | 0 356 075 B1 | 9/1995 |
| EP | 0 748 883 A1 | 12/1996 |
| EP | 0 902 067 B1 | 7/2001 |
| EP | 1 123 955 A2 | 8/2001 |
| WO | WO 01/66484 A1 | 9/2001 |

OTHER PUBLICATIONS

Asa Claesson et al., "UV-Transparent Coatings For Optical Fiber", Institute of Optical Research, Stockholm Sweden, International Wire and Cable Symposium Proceedings 1997.
Canning, et al., "UV Irradiation of Polymer Coatings on Optical Fibre", Optics Communications, 214 (2002) 141-145.
Chao et al., "Grating Writing Through Fibre Coating at 244 and 248 nm", Electronics Letters, May 27, 1999, vol. 35, No. 11.
Imamura et al., "Mechanical Strength Characteristics of Tincodoped Germanosilicate Fibre Bragg Gratings by Writing Through UV-Transparent Coating", Electronics Letters, May 14, 1998, vol. 34, No. 10.
Kurita, A.; "Transparent Silicone Elastomers (for Use in Optical Fibres)", *International Polymer Science and Technology* (1989); vol. 16, No. 7; translation submitted by G. Langsley; pp. T/45-T/49.

*Primary Examiner*—Sung Pak
*Assistant Examiner*—Jerry T. Rahll
(74) *Attorney, Agent, or Firm*—Elizabeth A. Gallo

(57) ABSTRACT

Disclosed herein is a coated optical fiber comprising: a siliceous optical fiber including a core inside a cladding; and a cured coating comprising: a thermally cured polyorganosilsesquioxane; and an oxide powder dispersed in said cured polyorganosilsesquioxane, wherein said oxide powder has a refractive index from about 1.2 to about 2.7 and includes a plurality of particles having a particle size less than about 100 nanometers, said cured coating having adhesion to said siliceous optical fiber and further having transparency to ultraviolet radiation. Also disclosed herein is a fiber optic device comprising the optical fiber.

8 Claims, No Drawings

COATED OPTICAL FIBER AND FIBER OPTIC DEVICE HAVING SAME

CROSS REFERENCE TO RELATED APPLICATION

This application is a divisional of U.S. application Ser. No. 10/386,849, filed Mar. 11, 2003, now pending, and incorporated herein by reference for all that it contains.

BACKGROUND

1. Field of the Invention

The invention relates to coated optical fibers having protective coatings. When used as optical wave-guides, these coatings allow passage of actinic radiation used to modify optical waveguide transmission characteristics. More particularly, the present invention provides coated optical fibers having nanocomposite coatings comprising finely divided particles dispersed in a polysiloxane to yield thermally cured write-through coatings. The coatings have transparency to both visible and ultraviolet radiation to facilitate changes of refractive index in an optical fiber that may be modified to include fiber optic gratings including dispersion compensation gratings.

2. Description of the Related Art

Manufacturing processes for high purity glass optical fibers typically include in-line coating equipment to apply protective polymeric coatings to fibers drawn from a melt or solid preform. A glass fiber, as drawn, exhibits very high tensile strength. Flaws develop on the surface of an optical fiber during contact with solids and many liquids. This leads to undesirable weakening of the optical fiber. A protective coating, applied before contact of the fiber with either contaminants or solid surfaces, aids retention of inherent high strength as it protects the fiber.

Conventional processes for incorporating light modifying features into coated optical fibers require removal of protective coatings from manufactured optical fiber structures. The coatings typically attenuate passage of ultraviolet radiation. Exposure of coated optical fibers to high intensity ultraviolet radiation for through-coat variation of refractive index generally causes coating decomposition and deterioration of beam intensity reaching the optical fiber core. Modification of light transmission characteristics of optical fibers is desirable to include a variety of special features in selected, relatively short lengths of optical fibers to be spliced or otherwise incorporated into fiber optic systems and devices. A fiber Bragg grating represents a light-modifying feature that may be introduced or written into an optical fiber by exposure to ultraviolet radiation. Gratings may be written for a variety of applications including dispersion compensation, controlling the wavelength of laser light, and modifying the gain of optical fiber amplifiers.

A capability for through-coat refractive index variation of optical fibers would overcome the need to remove protective coatings before modifying the core of an optical fiber. Use of a substantially radiation-transparent or write-through coating also moderates the need to apply a protective recoat material after exposing a coated optical fiber to ultraviolet radiation. Elimination of process steps contributes to production efficiencies at lower cost.

Write-through coatings for optical fibers have been described for a variety of polymer types including fluorinated polymers and polysiloxane materials. Claesson et al (International Wire & Cable Symposium Proceedings 1997, Pages 82–85 (46$^{th}$ Philadelphia, Pa.)) use two polymers to coat germanosilicate optical fibers prior to exposure to an ultraviolet radiation pattern to produce Bragg gratings in optical fibers so exposed through the polymer coatings. The coatings, applied by solvent dip or die draw, were TEFLON AF 1600 and KYNAR 7201. When thin (20 μm–50 μm) films of KYNAR 7201 were exposed to a pulsed excimer pumped frequency doubled dye laser at a wavelength of 242 nm, the plastic rapidly degraded, darkened and decomposed.

No degradation was observed for films (6 μm) of TEFLON AF 1600 coated on boron co-doped fibers during exposure to a pulsed excimer pumped frequency doubled dye-laser at 242 nm to write a Bragg grating (1 cm long) using an interferometric technique. The estimated fluence in the core per pulse was 1 J/cm$^2$ and the accumulated dose for writing the grating was 140 J/cm$^2$. Optical fibers were coated using relatively crude conditions including the use of a fluorosilane and heating to 330° C. for 10–15 minutes to improve adhesion.

Imamura et al (Electronics Letters, Vol. 34, No. 10, pp. 1016–1017) describes the preparation of a coated optical fiber and conditions used to expose the fiber to ultraviolet radiation during writing of a Bragg grating. The ultraviolet radiation source was a frequency quadrupled Q-switched YAG laser operating at 266 nm. This laser was capable of delivering a mean power of 100 mW at 10 Hz repetition with pulse duration of 50 ns. The description includes further detail of conditions used to form a Bragg grating.

The only information regarding the fiber coating material describes it as an ultraviolet curable resin formulated with a photoinitiator for increased transparency at 266 nm. Recommended conditions for forming a Bragg grating through a 60 μm coating of the resin include 10 minutes exposure to a dose of 150 J/cm$^2$. At this condition the ultraviolet absorbance at 266 nm wavelength was <1.07.

Chao et al (Electronics Letters, Vol. 35, No. 11 (27$^{th}$ May 1999) and U.S. Pat. No. 6,240,224) discusses drawbacks of earlier attempts to write gratings through coatings over optical fibers before discussing the use of a thermally cured silicone coating (RTV 615). This material has suitable transparency to ultraviolet radiation since it contains no photoinitiator that would attenuate ultraviolet beam intensity. An ultraviolet spectrum reveals that a 150 μm thick layer of silicone between silica plates will transmit 85% of incident radiation at a wavelength of 225 nm. From 225 nm to 235 nm and above there is a gradual increase of radiation transmitted to 92%. Low absorption of ultraviolet radiation offers the possibility of Bragg grating writing through the silicone rubber coating using either a frequency doubled Argon-ion laser at 244 nm or a KrF excimer laser at 248 nm.

Although omitting both the coating steps and conditions, a patent to Aspell et al (U.S. Pat. No. 5,620,495) describes formation of an optical fiber grating by writing through a methylsilsesquioxane coating. Organosilsesquioxane coatings are known to undergo significant shrinkage when they cure. Bagley et al (U.S. Pat. No. 4,835,057), for example, describes glass fibers having organosilsesquioxane coatings that fail to protect the underlying optical fiber core when used as coating layers that are less than 5 μm thick. Honjo et al (U.S. Pat. No. 5,052,779) describes organosilsesquioxanes as ladder-type polysiloxanes having low elongation. Low elongation leads to cracking during curing of coatings made from these materials. According to the reference, the cracking problem may be reduced when the coating formulation contains a linear polymethyl siloxane having hydroxyl groups and solvent in addition to the ladder-type polymer. Bautista et al (U.S. Pat. No. 4,962,067; EP 902067 and EP 1123955) describe the effect of viscosity variation on the properties of coatings containing ladder-type siloxane polymers.

Transparent coatings, as described above, are known as write-through coatings. Chao et al (Electronics Letters, Vol. 35, No. 11 (27th May 1999) and U.S. Pat. No. 6,240,224) in fact recommends the use of thermally cured silicone coatings as candidate materials for write-through coatings. Application of thermally cured silicones to optical fibers retains maximum ultraviolet transparency by avoiding the use of compositional components that may absorb ultraviolet radiation. Absorption of radiation during periodic modification of the refractive index of an optical fiber interferes with formation of a refractive index grating in the fiber.

Claesson et al (International Wire & Cable Symposium Proceedings 1997, Pages 82–85 (46th Philadelphia, Pa.)) describes the use of fluorinated polymers as write-through coatings. Imamura et al (Electronics Letters, Vol. 34, No. 10, pp. 1016–1017) discusses photocurable resins including photoinitiators having minimal absorption in a portion of the ultraviolet spectrum. These write-through resins were not identified. Other omissions from previous descriptions include the use of continuous processes for applying write-through coatings and the conditions and amount of time required to cure selected coatings circumferentially around the fiber. Such omissions reinforce the need for improvement in coating compositions and methods for applying write-through coatings to optical fibers so as to improve the production rate for fiber optic devices including refractive index gratings also referred to as Bragg gratings.

SUMMARY

Disclosed herein is a coated optical fiber comprising: a siliceous optical fiber including a core inside a cladding; and a cured coating comprising: a thermally cured polyorganosilsesquioxane; and an oxide powder dispersed in said cured polyorganosilsesquioxane, wherein said oxide powder has a refractive index from about 1.2 to about 2.7 and includes a plurality of particles having a particle size less than about 100 nanometers, said cured coating having adhesion to said siliceous optical fiber and further having transparency to ultraviolet radiation.

Also disclosed herein is a fiber optic device comprising: an optical fiber having sensitivity to radiation; a cured coating transparent to said radiation, said cured coating comprising: a cured polyorganosilsesquioxane; and an oxide powder dispersed in said cured polyorganosilsesquioxane to provide said cured coating having adhesion to said optical fiber; and a radiation induced variation of refractive index in said optical fiber produced during passage of said radiation through said cured coating to provide said fiber optic device. The fiber optic device may be a fiber optic grating selected from the group consisting of wavelength selective filters, pump stabilization gratings, dispersion compensation gratings, gain flattening filters and long period gratings.

Coating dispersions for application to a siliceous optical fiber are described, and which are applied under draw tower conditions, after formation of the optical fiber, drawn from a glass preform. The coating dispersions comprise fine particles smaller than 0.1 µm. Such small particles may be described as nanoparticles characterized by a particle size of less than about 100 nanometers (nm). Nanoparticles typically include particles of metals, oxides, nitrides, carbides, chlorides or the like. The use of nanoparticles, particularly inorganic oxide nanoparticles and surface treated inorganic oxide nanoparticles, provides coating dispersions also referred to herein as nanocomposite coating dispersions. Inorganic oxides including silicon oxide, zirconium oxide, hafnium oxide, aluminum oxide, and vanadium oxide, mixed oxides and mixtures thereof, may be selected for their lack of absorption of ultraviolet radiation, to prepare nanocomposite coating dispersions according to the present invention. A nanocomposite coating dispersion comprises oxide nanoparticles dispersed in an organosilsesquioxane polymer, providing coating compositions of increased density and greater resistance to cracking upon curing than earlier known organosilsesquioxane coatings. At least one advantage of the use of oxide nanoparticles in coatings for optical fibers is improvement of abrasion resistance of cured nanocomposite coatings. Another advantage is the retention of transparency of cured coating dispersions, allowing modification of refractive index of an optical fiber using radiation from a range of wavelengths in the visible and ultraviolet regions of the spectrum with at least one protective coating around the optical fiber. Suitable selection of an inorganic oxide or oxide mixture allows control of the refractive index properties of optical fiber coatings depending upon the refractive index and concentration of nanoparticles in the dispersion. An increase of refractive index, from that of the polyorganosilsesquioxane, occurs with increasing concentration of a selected inorganic oxide that has a refractive index higher than the polyorganosilsesquioxane. Another approach to refractive index variation retains a constant total concentration of an inorganic oxide mixture comprising two or more oxides differing in refractive index properties. Adjustment of the ratio of oxides causes change in the refractive index of the nanocomposite coating dispersion and cured coatings produced from the coating dispersion. Manipulation of oxide composition and concentration, as indicated, produces cured nanocomposite layers having a refractive index in the range from about 1.2 to about 1.7. It is possible, using nanocomposite coating dispersions, to fabricate optical fibers coated with at least one layer of material having a controlled refractive index equal to or higher than the refractive index of the optical fiber cladding.

Draw tower application of nanocomposite coatings as described herein protects the surface of a freshly drawn optical fiber from damage. A protected optical fiber substantially retains its physical properties during processing and handling for rewinding and optical fiber modification by hydrogen loading, writing of refractive index gratings and annealing the modified optical fiber. Although attenuating polymeric coatings may be removed to write a refractive index grating, such as a dispersion compensation grating, into an optical fiber, use of write-through, nanocomposite coatings according to the present invention gives protection to the optical fiber during writing and related processing. Such coatings, containing oxide nanoparticles in a matrix of an organosilsesquioxane, such as methylsilsesquioxane, are transparent to both visible and ultraviolet radiation after elevated-temperature curing, on the surface of glass substrates exemplified by glass optical fibers.

A coating that remains on the surface of an optical fiber during writing of a refractive index grating is known as a "write-through coating." Previous work has identified protective polymers having transparency to ultraviolet radiation. U.S. Pat. No. 5,620,495 describes the use of polymethylsilsesquioxane as a write-through coating material for optical fiber. There is no evidence of the use of nanoparticle filled coating compositions. Also, this reference omits the process steps and time required to achieve refractive index grating formation using an ultraviolet laser. As discussed below, fumed silica materials are generally unsuitable for dispersed powders according to the present invention.

U.S. Pat. Nos. 4,946,874 and 5,169,879 indicate the optional use of fumed silica and preferably a benzene soluble silicone resin as reinforcing agents for the primary coating of optical fibers. There is nothing to show write-through capability for coatings containing fumed silica reinforcing agents.

U.S. Pat. No. 4,835,057 describes glass fibers having organosilsesquioxane coatings and claddings but notes that "claddings less than 5 microns in thickness fail to produce the desired protective effect." Silsesquioxane polymers, used as fiber optic coatings, shrink when they cure. U.S. Pat. No. 5,052,779 notes that ladder type polysiloxanes (organosilsesquioxane) have very low elongation that could lead to cracked coatings. Published application EP 902067 further describes the use of ladder polysiloxane coatings.

Other reports of write-through coatings refer to standard, typically acrylate, fiber optic coatings, using Argon-ion near UV lasers (325–364 nm, but most typically 351 nm) or tripled YAG 355 nm, for write-through variation of refractive index. Even with this modification, Canning et al report in Optics Communications, Vol. 214, page 141, 2002, that standard fiber optic coatings have a moderate absorption, which, in combination with limited glass photosensitivity at longer wavelengths, leads to much longer grating writing times.

Nanocomposite coatings compare favorably with other write-through coatings such as those provided by deposit of diamond-like glass films that form a protective layer over the optical fiber cladding, for example. Published application WO 01/66484 A1 describes diamond-like coatings and methods for their application to protect optical fibers having suitable sensitivity to radiation from an ultraviolet laser for introduction of refractive index gratings into the optical fiber. Diamond-like glass (DLG), which is transparent to ultraviolet radiation, requires a separate application process after formation of the optical fiber in a draw tower. The process includes stripping of a standard acrylate coating from the optical fiber before depositing the DLG material at rates of about 6 m/min (two feet/min). A process for depositing a diamond-like glass film on an optical fiber typically yields several hundred meters of treated fiber.

In contrast, it has been demonstrated that optical fibers may be coated in a draw tower with nanocomposite coating dispersions according to the present invention. Application of coating material during fiber draw proceeds at coating rates up to about 60 meters per minute. This allows lengths of several kilometers to be produced limited only by the size of the glass preform rather than the extended time required to apply a DLG film to a stripped optical fiber. Increased treatment rates and volumes of treated optical fiber offers advantages of efficiency and cost saving compared to diamond-like glass write-through deposits.

Preparation of composite coating compositions, including highly dispersed nanoparticles, may include surface treatment of the particles with surface modifying agents such as carboxylic acids, silanes, and other types or mixtures of dispersants. Surface treatment improves compatibility between the nanoparticles and the organosilsesquioxane dispersion phase of exemplary compositions. Particularly suitable nanocomposite coating dispersions according to the present invention comprise dispersed oxide sol particles in an organosilsesquioxane composition that show little tendency towards thixotropy. This behavior differs from thixotropic dispersions containing fumed silica and related materials that cause stress-related variation of viscosity and flow that is undesirable for coatings applied in an optical fiber draw tower.

As described herein, the coating dispersion comprises a polyakylsilsesquioxane polymer and an oxide powder dispersed in the organosilsesquioxane polymer. A suitable oxide powder has a refractive index from about 1.2 to about 2.7 and a particle size less than about 100 nanometers. The coating dispersion is heat-curable to provide an ultraviolet radiation-transparent, cured coating.

A cured coating comprises a thermally cured polyorganosilsesquioxane and an oxide powder of the type described above. The cured coating is transparent to ultraviolet radiation. Transparency of the coating to radiation persists for a time of about 3.0 seconds to >300 seconds during exposure to 500 W/cm$^2$ of ultraviolet radiation. At lower radiation intensities of about 250 W/cm$^2$, transparency of the coating persists from about 18 seconds to >300 seconds.

Also described herein is a process for draw tower application of a cured layer of a nanocomposite coating dispersion directly on to a freshly drawn siliceous optical fiber. Process steps include providing a nanocomposite coating comprising a polyorganosilsesquioxane and an oxide powder dispersed in the polyorganosilsesquioxane to provide a coating dispersion wherein the oxide powder has a refractive index from about 1.2 to about 2.7 and includes a plurality of particles having a particle size less than about 100 nanometers. The coating dispersion adheres to the optical fiber. After supplying the nanocomposite coating dispersion to a coating die assembly in the optical fiber draw tower the nanocomposite coating dispersion is applied to the optical fiber. Elevated temperature curing of the nanocomposite coating dispersion provides a cured write-through coating having a thickness in a range from about 2 μm to about 10 μm on the optical fiber. The cured write-through coating has transparency that persists for about 18 seconds to >300 seconds during exposure to 250 W/cm$^2$ of ultraviolet radiation. One or more layers of the nanocomposite coating may be applied using appropriate die assemblies.

The present invention further provides an exemplary fiber optic device comprising an optical fiber having sensitivity to radiation. The optical fiber includes a cured coating transparent to the radiation. The cured coating comprises a cured polyorganosilsesquioxane and an oxide powder dispersed in the cured polyorganosilsesquioxane to provide the cured coating having adhesion to the optical fiber. The coated optical fiber includes a radiation induced variation of refractive index in the optical fiber produced during passage of the radiation through the cured coating to provide the fiber optic device.

Suitable fiber optic devices include fiber optic gratings exemplified by wavelength selective filters, pump stabilization gratings, dispersion compensation gratings, gain flattening filters and long period gratings.

A process for forming a fiber optic device comprises the steps of providing a photosensitive optical fiber for coating with a write-through coating transparent to ultraviolet radiation. The write-through coating comprises a polyorganosilsesquioxane; and an oxide powder dispersed in the polyorganosilsesquioxane to provide a coating dispersion wherein the oxide powder has a refractive index from about 1.2 to about 2.7 and includes a plurality of particles having a particle size less than about 100 nanometers. The coating dispersion adheres to the photosensitive optical fiber for curing to provide a coated optical fiber having thereon a cured write-through coating having transparency to ultraviolet radiation. Exposure of the coated optical fiber to ultraviolet radiation produces a change of refractive index in the coated optical fiber to provide the fiber optic device.

Terms used to describe the present invention correspond to the following definitions.

The term "nanoparticle" signifies a particle size of less than 0.1 μm (100 nm). Powders containing nanoparticles comprise the dispersed phase of nanocomposite coating dispersions according to the present invention.

Terms such as "nanocomposite coating" or "nanocomposite coating dispersions" and the like refer to fluid coating dispersions comprising a fluid dispersion phase containing a dispersed phase including a nanoparticulate powder.

Terms such as "silsesquioxane" or "organosilsesquioxane" or "polyorganosilsesquioxane" or the like refer to the fluid dispersion phase of a nanocomposite coating dispersion. The dispersion phase may include a blend of fluids or added solvent that provides a solution dispersion phase.

The term "nanoparticulate powder" or "oxide powder" or the like, as used herein, refer to a powder having an average particle size less than about 100 nm. Nanoparticulate powders may be selected from powdered oxides containing a single oxide, a mixture of different oxides and mixed oxides composed of individual particles of mixed oxides, e.g. zirconia treated silica.

The term "write-through coating" or "coating having transparency" or the like refer to nanocomposite coatings that include solid nanoparticles yet allow passage of radiation, typically ultraviolet radiation, through the coating to modify the physical characteristics, e.g. refractive index, of underlying structures particularly siliceous optical fibers. A cured write-through coating has a refractive index in a range from about 1.2 to about 1.7.

The term "weight average molecular weight" refers to molecular weights of polyorganosilsesquioxanes determined by the method of gel permeation chromatography using a Polymer Labs PL Gel Mixed B column set in a Waters 2695 separation module run at 35° C. in THF with a flow rate of 1.0 ml/min. Changes in concentration were detected by a Wyatt Optilabs refractive index detector and molecular weights were determined based upon a calibration made of narrow dispersity polystyrenes ranging in molecular weight from 580 to $7.5 \times 10^6$.

All percentage, parts and ratios herein are by weight, e.g. weight percent (wt %) unless specifically noted otherwise.

DETAILED DESCRIPTION

As required, detailed embodiments of the present invention are disclosed herein; however, it is to be understood that the disclosed embodiments are merely exemplary of the invention that may be embodied in various and alternative forms. Therefore, specific details disclosed herein are not to be interpreted as limiting, but merely as a basis for the claims and as a representative basis for teaching one skilled in the art to variously employ the present invention.

Change of refractive index in the core or cladding of a siliceous optical fiber typically requires exposure of the bare optical fiber by stripping away its protective coatings. Removal of coatings provides a stripped optical fiber that is vulnerable to damage by impact or surface contaminants. A damaged optical fiber may lack the physical strength to fulfill its intended function. Such damage could be avoided if at least one protective layer remained in place during modification of the properties of the optical fiber. This is possible using coating dispersions according to the present invention that, after curing, are transparent and substantially stable during exposure to high intensity ultraviolet laser irradiation. Oxide and mixed oxide nanoparticles, and surface treated versions thereof, suitably dispersed in a polysiloxane matrix provide nanocomposite coating dispersions that are transparent both to visible light and ultraviolet radiation from high intensity lasers used to fabricate fiber gratings in optical fibers.

The write-through coatings for optical fibers allow introduction of refractive index changes in a selected portion of an optical fiber while protecting the glass fiber from damage. Conventional optical fiber products include coatings that typically absorb ultraviolet radiation emitted by the laser used to introduce refractive index changes. Ultraviolet laser induced changes of refractive index in an optical fiber typically follow exposure to the full intensity of the laser. This explains the need to remove conventional coatings from an optical fiber to obtain the full impact of the laser energy to the optical fiber. Removal of coatings returns the resulting bare optical fiber to a condition in which it is vulnerable to damage during the writing and subsequent recoating of a fiber optic grating, for example.

A particular advantage of protective, write-through coatings is the capability provided for writing a long-length dispersion compensation grating that occupies a significant length of an optical fiber. Without protection from the write-through coating, contact between the optical fiber and handling equipment would compromise the reliability of the long length dispersion compensation grating and cause loss of the mechanical integrity of the bare glass optical fiber.

In general, a nanocomposite coating dispersion can be defined as a polymer matrix that contains well-dispersed nanoparticles. Optimum dispersion of the nanoparticles in a polymer matrix may depend upon surface treatment of the nanoparticles with surface modifying agents selected from carboxylic acids, silanes and dispersants.

Suitable acidic surface modifiers include, but are not limited to, 2[-2-(2-methoxyethoxy)ethoxy]acetic acid and hexanoic acid. Silane surface modifiers include, but are not limited to, methyltriethoxysilane, isobutyltrimethoxysilane and isooctyltrimethoxysilane.

Nanoparticles may be surface treated as needed to achieve compatibility between the polymeric dispersion phase and dispersed nanoparticles. Increasing amounts of surface modifier, to approximately monolayer coverage, appear to enhance both transparency and stability of nanoparticle dispersions. Too much surface modifier appears, in some cases, to adversely affect dispersion stability.

Dispersions of suitable transparency provide write-through coatings according to the present invention, which may have a nanoparticle content in a wide range from about 10 wt % to about 80 wt %. Consistency of results improved when the range was narrowed to between 15 wt % and 35 wt %. Coating compositions containing increased amounts of surface treated nanoparticles tend to exhibit reduced transparency. A distinguishing feature of zirconia nanoparticle-filled, write-through coatings, compared to write-through coatings reported previously, is the provision of a protective coating having a refractive index exceeding that of a typical cladding of an optical fiber. A high refractive index coating of this type provides benefits overcoming undesirable optical properties, in certain fiber and device applications, when the fiber cladding acts as a multimode waveguide due to the use of an optical fiber coating having an index of refraction lower than that of the cladding. It will be appreciated that the refractive index of nanocomposite coating dispersions may be adjusted within a range of refractive indices depending upon the nanoparticles or mixtures of nanoparticles that may be used. At least two possible approaches exist for adjusting or tuning the refractive index of nanocomposite coatings. The first involves tuning of refractive index as a function of the concentration of a dispersed oxide or mixture of oxides in the dispersion phase of organosilsesquioxane. A second method maintains the oxide at a fixed concentration or within a narrow range of concentrations using ratios of two or more types of nanoparticles, differing in refractive index, to tune the refractive index of the nanocomposite coating dispersion.

Exemplary filled dispersions preferably show minimal tendency towards thixotropic behavior. Thixotropic dispersions, of the type produced by fumed silica, exhibit shear thinning that negatively affects control and quality of coatings applied to optical fibers.

Nanoparticles comprise colloidal particles suitable for surface treatment with alkyltrialkoxysilanes, for example, to provide individual surface treated particles or small particle agglomerates of controlled particle size. Addition of these surface treated particles into a resin system under suitable conditions, causes a slow increase in viscosity until particle concentration reaches a high level. At a point of critical particle loading, inter-particle separation drops into a range wherein particle-to-particle interaction occurs. Particle interaction varies with interparticle separation depending upon the surface active agent used in surface treatment of the colloidal particles. Careful selection of a surface active agent ensures preparation of a dispersed phase containing substantially separate, particles or small aggregates of particles having affinity for the dispersion phase material until particles approach each other so closely that interparticle attraction occurs. At the point where interparticle attraction occurs, nanoparticles may exhibit behavior similar to thixotropic dispersions like those described previously for fumed silica.

Nanocomposite coatings provide the advantages of crack resistance, improved flexibility and abrasion resistance when compared to unfilled cured coatings especially for optical fibers. Colloidal nanoparticles dispersed in an organosilsesquioxane fluid resin produced coatings that were less susceptible to shrinkage during cure than unfilled coating compositions. The more a coating shrinks during cure, the more likely it is to crack. Introduction of precondensed nanoparticulates into the silsesquioxane coating provides coatings having reduced shrinkage. The appearance of cracks in a cured optical fiber coating leads to rejection of the coated optical fiber for write-through formation of a fiber optic device, such as a Bragg grating, in the optical fiber. Coating cracks introduce mechanical weakness and optical errors to a fiber optic grating.

Optional additives to increase the flexibility to coatings according to the present invention include materials that may be added to coating formulations in small amounts from about 5.0 wt % to about 20.0 wt % or more. Materials that increase flexibility typically lower the amount of crosslinking to provide a cured coating having increased elongation. Additives that change the flexibility of a coating may be used to match coating elongation to that of the glass of an optical fiber thereby giving improved tensile strength and resistance to cracking.

Particles falling under the definition of nanoparticles have an average particle size less than 100 nanometers. Materials that may be converted into nanoparticulate form include metals, oxides, nitrides, carbides and chlorides and the like. Nanoparticles, dispersed in a polymer matrix, substantially maintain their size and shape as a pre-condensed phase and thus reduce shrinkage during cure. Although not wishing to be bound by theory, reduced shrinkage appears to occur because precondensed nanoparticles occupy some of the volume of a coating composition, reducing the amount of organosilsesquioxane that needs to cure, thereby reducing the shrinkage attributable to the dispersion phase. Alternatively, the presence of a dispersed particle provides an "energy absorber" as a deterrent to propagation or even the formation of micro-cracks. For this reason, coated dispersions exhibit dimensional stability and less tendency for cracks to form as the coating cures. The presence of nanoparticles also increases the durability and abrasion resistance of thin optical fiber coatings that have a thickness typically less than about 5 μm. After application and curing on an optical fiber formed in a draw tower, the durable nanocomposite coating provides protection for the underlying glass optical fiber during post draw processes that include rewinding, removal of outer coatings, hydrogen loading, changing optical fiber refractive index by, for example, writing of refractive index gratings through the nanocomposite coating and annealing to stabilize the modified optical fiber.

Suitable matrix polymers include organosilsesquioxanes, particularly methylsilsesquioxane resins, having a molecular weight from about 2,300 to about 15,000 as determined using gel permeation chromatography.

As indicated previously, nanoparticles of oxides including silicon and zirconium oxides, having a refractive index from about 1.2 to about 2.7, may be dispersed in a liquid polysiloxane-containing matrix to provide nanocomposite coating dispersions according to the present invention comprising particles having an average particle size below about 100 nanometers (0.1 μm) preferably from about 5 nm to about 75 nm. An exemplary coating, comprising silica or zirconia nanoparticles dispersed in polymethylsilsesquioxane, was applied and thermally cured over the cladding of a bare glass optical fiber as the fiber was drawn from a glass pre-form. Curing may optionally use a catalyst such as a mixture of formic acid and tetramethylammonium hydroxide or other alkylammonium hydroxides. After curing, the coating had a thickness of approximately 3 μm, a refractive index from about 1.2 to about 1.7 and maintained transparency to ultraviolet radiation. The resulting coated optical fiber passed through other sections of the draw tower for application of one or more additional coatings to provide a fully coated optical fiber for collection at an optical fiber wind-up station.

Bragg gratings, for example dispersion compensation gratings were written into a coated optical fiber, of the type previously described, after removal of the additional coatings. This provides an optical fiber covered by a nanocomposite coating that is transparent to visible and ultraviolet radiation. In the case of cured nanocomposite coatings containing zirconia, the crystalline form of zirconia is preferred because evidence suggests formation of cured coatings having desirable, higher refractive index values than similar coatings formulated using amorphous zirconia nanoparticles.

Cured nanocomposite coatings protect coated optical fibers from damage and shield the optical fiber from loss of physical strength characteristics during further processing. Properties of nanocomposite coatings include thermal stability at 200° C. so that the optical fiber coating survives elevated temperature processing of hydrogen loading and thermal stabilization. Hydrogen loading of the nanocomposite coated optical fiber increases its sensitivity to ultraviolet radiation, which increases the rate of formation of e.g. a dispersion compensation grating. Thermal stabilization is an annealing process that induces relaxation in the structure of the fiber optic grating to provide a device having stable optical performance. In some instances, the mechanical strength of nanocomposite-coated optical fibers remains high, after refractive index modification, with no visible degradation (browning, melting, or ablation) of the coating after annealing at temperatures up to 300° C. There is evidence to show that cured zirconia nanocomposite may be annealed at 300° C. while silica-containing coatings are consistently reliable after annealing at 200° C.

Experimental

Raw Materials

NP1=Silica-NALCO 2327, available from Ondeo Nalco Company, Bedford Park, Ill. as a dispersion of 20 nm silica particles approximately 41 wt % in water.

NP2=Silica-NALCO 2326, available from Ondeo Nalco Company, Bedford Park, Ill. as a dispersion of 5 nm silica particles approximately 16.5 wt % in water.

NP3=Zirconia-OOSS008, available from Ondeo Nalco Company, Bedford Park, Ill. as an acetate stabilized sol containing 23 wt % zirconia nanoparticles in water.

NP4=Zirconia nanoparticles, according to U.S. Pat. No. 6,376,590, available from 3M Company, St. Paul, Minn., having a size range from about 13 nm to about 23 nm. A silane surface treatment was applied to these particles using 2[-2-(2-Methoxyethoxy)ethoxy]acetic acid.

NP5=Silica/Zirconia mixed oxide nanoparticles sol—OP-TOLAKE #4 available from Catalysts & Chemicals Ind. Co., Ltd., Kawasaki City, Kanagawa, Japan.

OS1=GR-650 F, available from Techneglas Inc., Perrysburg, Ohio as a polymethyl-silsesquioxane resin having a molecular weight of 8,050.

OS2=GR-650 SD, available from Techneglas Inc., Perrysburg, Ohio as a polymethyl-silsesquioxane resin having a molecular weight of 2390.

OS3=GR-653 L, available from Techneglas Inc., Perrysburg, Ohio as a polymethyl-silsesquioxane resin having a concentration of 30 wt % in butyl alcohol and a molecular weight of 13,900.

OS4=GR-654 L, available from Techneglas Inc., Perrysburg, Ohio as a 30 wt % solution in butyl alcohol of a polymethylsilsesquioxane resin having a molecular weight of 13,900.

Catalyst=a mixture of formic acid and tetramethylammonium hydroxide as a catalyst.

S1=DOWANOL-PM (1-methoxy, 2-propyl alcohol) available from Aldrich Chemical Company, Milwaukee, Wis.

S2=Butyl alcohol, available from Aldrich Chemical Company, Milwaukee, Wis.

SM1=2[-2-(2-Methoxyethoxy)ethoxy]acetic acid, available from Aldrich Chemical Company, Milwaukee, Wis.

SM2=Hexanoic acid, available from Aldrich Chemical Company, Milwaukee, Wis.

SM3=Methyltriethoxysilane, available from Aldrich Chemical Company, Milwaukee, Wis.

SM4=Isooctyltrimethoxysilane, available from Aldrich Chemical Company, Milwaukee, Wis.

SM5=Phenyltrimethoxysilane, available from Aldrich Chemical Company, Milwaukee, Wis.

SM6=Silquest A1230, a polyethylene glycol trialkoxysilane available from OSi Specialties, A Crompton Business, Greenwich, Conn.

D1=Diethoxydimethylsilane available from Aldrich Chemical Company, Milwaukee, Wis.

Organosilsesquioxane Blends
OB1=GR 650 F (50 wt %)+GR 650 SD (50 wt %)
OB2=GR 650 SD (60 wt %)+GR 653 L (40 wt %)

Methods of Sol Preparation: (Surface Modification of Nanoparticles)

Method 1 (Silica Sols)

SS1—A dispersion in water of silica nanoparticles (250 g NP1) was added to a 1-liter reaction vessel equipped with a stir bar. A solution of 8.48 g of SM3 and 3.72 g SM4 in 400 g of S1 was added dropwise to the stirring nanoparticle dispersion over a period of 30 minutes. After the addition, the dispersion was stirred for an additional 15 minutes at room temperature. The vessel was sealed and heated to 90° C. for 20 hours. Water was removed, under vacuum, from the dispersion to give a bluish dispersion of silica nanoparticles in S1. The dispersion was filtered through a coarse filter and the solids content of the filtrate was adjusted to 30 wt % nanoparticles by addition of S1.

SS2—A dispersion in water of silica nanoparticles (250 g NP1) was added to a 1-liter reaction vessel equipped with a stir bar. A solution of 5.67 g of SM3 and 7.46 g SM4 in 400 g of S1 was added dropwise to the stirring nanoparticle dispersion over a period of 30 minutes. After the addition, the dispersion was stirred for an additional 15 minutes at room temperature. The vessel was sealed and heated to 90° C. for 20 hours. Water was removed, under vacuum, from the dispersion to give a bluish dispersion of silica nanoparticles in S1. The dispersion was filtered through a coarse filter and the solids content of the filtrate was adjusted to 30 wt % nanoparticles by addition of S1.

SS3—A dispersion in water of silica nanoparticles (250 g NP2) was added to a 1-liter reaction vessel equipped with a stir bar. A solution of 8.51 g of SM3 and 3.73 g SM4 in 400 g of S1 was added dropwise to the stirring nanoparticle dispersion over a period of 30 minutes. After the addition, the dispersion was stirred for an additional 15 minutes at room temperature. The vessel was sealed and heated to 90° C. for 20 hours. Water was removed, under vacuum, from the dispersion to give a bluish dispersion of silica nanoparticles in S 1. The dispersion was filtered through a coarse filter and the solids content of the filtrate was determined to be 11.05 wt %.

SS4—A dispersion in water of silica nanoparticles (250 g NP1) was added to a 1-liter reaction vessel equipped with a stir bar. A solution of 12.67 g of SM5 in 400 g of S1 was added dropwise to the stirring nanoparticle dispersion over a period of 30 minutes. After the addition, the dispersion was stirred for an additional 15 minutes at room temperature. The vessel was sealed and heated to 90° C. for 20 hours. Water was removed, under vacuum, from the dispersion to give a bluish dispersion of silica nanoparticles in S1. The dispersion was filtered through a coarse filter and the solids content of the filtrate was adjusted to 30 wt % nanoparticles by addition of S1.

Method 2

ZS1—A dispersion in water of zirconia nanoparticles (1.12 g NP3) was added to a 20 ml vial. Surface modifier (46 mgs of SM1) was added to yield a white translucent sol.

Method 3

ZS2—A dispersion in water of zirconia nanoparticles (21.16 g NP3) and surface modifier (21.16 g SM1) were added to a 16 oz glass vessel. A solvent (200 g of S2) was added to the mixture. After the addition, the solution was evaporated almost to dryness using a rotary evaporator. The solid was redispersed in 140 g of S2 and again evaporated almost to dryness using the rotary evaporator. This provided a material that was then dispersed in 116.8 g of S2 solvent to give a sol of 25 wt % zirconia (36.5 wt % solids).

Method 4

ZS3—A dispersion in water of zirconia nanoparticles (50 g of NP3) and a solvent (50 g of S2) were added to an eight oz. vessel. A mixture of surface modifiers (4.1 g SM1 and 2.67 g SM2) was added to the nanoparticulate dispersion followed by drying at 125° C. in a vented oven. A sol was obtained by dispersing the resulting 6.14 g of dry powder in 14.32 g of SM2 solvent. A centrifuge (Model IEC HT, available from International Equipment Company, Needham Heights, Mass.) operating at 12,000 rpm for 15 minutes was used to remove large particles from the resulting sol. Centrifuged sols typically provide write-through coatings having improved transparency to ultraviolet radiation. The purpose of centrifugation is to remove a small number of larger diameter particles that cause laser beam attenuation either by absorbing or scattering the ultraviolet radiation used to modify the refractive index characteristics of an optical fiber.

ZS4—A dispersion in water of zirconia nanoparticles (50 g of NP3), a solvent (50 g of S2) and a surface modifier. (5.12 g SM1) were added to an 8 oz. vessel followed by drying at 125° C. in a vented oven. A sol was obtained by dispersing the resulting 4.22 g of dry powder in 9.85 g of SM2 solvent. The resulting dispersion was centrifuged as described above for ZS3.

Method 5

ZS5—A dispersion in water of zirconia nanoparticles (200 g of NP4) was added to a 500 ml vessel. The dispersion was concentrated to 51 g using a rotary evaporator. Solvent (67 g of S2) was added to the dispersion followed by evaporation to provide 43 g of dispersion. Additional solvent (40 g of S2) was added to the dispersion followed by evaporation to reduce the dispersion to 15 g that contained 28 wt % zirconia.

Method 6

ZS6—A dispersion in water of zirconia nanoparticles (63 g of NP3) and surface modifier(2.59 g SM1) were added to a 250 ml vessel. After mixing to provide a homogeneous dispersion, solvent (66 g of S1) was added to the mixture and the solution was evaporated using a rotary evaporator to remove water. A further amount of solvent (66 g of S1) was added followed by evaporation using the rotary evaporator to produce 49 g of dispersion. The final sol was obtained by adding a further amount of solvent (65 g of S1) to provide 57.35 g of sol.

Method 7

ZS7—A dispersion in water of zirconia nanoparticles (250 g of NP3) and surface modifier(10.58 g SM1) were added to a 1000 ml vessel. After mixing to provide a homogeneous dispersion, solvent (250 g of S2) was added and the mixture was evaporated using a rotary evaporator to produce 533.58 g of dispersion. A further amount of solvent (250 g of S2) was added followed by evaporation using the rotary evaporator to produce 502.58 g of dispersion. More solvent (251 g of S2) was added followed by evaporation using the rotary evaporator to produce 247.38 g of dispersion. A centrifuge (Model IEC HT, available from International Equipment Company, Needham Heights, Mass.) operating at 12,000 rpm for 15 minutes was used to remove large particles from the resulting sol. Centrifuged sols typically provide write-through coatings having improved transparency to ultraviolet radiation. The purpose of centrifugation is to remove a small number of larger diameter particles that cause laser beam attenuation either by absorbing or scattering the ultraviolet radiation used to modify the refractive index characteristics of an optical fiber.

Method 8

ZS8—A dispersion of zirconia coated silica nanoparticles (20 g of NP5), surface modifier (1.09 g of SM6) and one drop of 48% hydrofluoric acid were added to an eight ounce glass jar The mixture was heated at 90° C. for 16 hours. After mixing to provide a homogeneous dispersion, solvent (33 g of S1) was added and the mixture was evaporated using a rotary evaporator to remove 50 grams of liquid, which was predominantly water. Additional solvent (22 g of S1) was added followed by evaporation using the rotary evaporator to produce a sol containing 14.2 weight percent metal oxide (17.9 weight percent solids). An amount of 15 g of this sol was reduced on a rotatory evaporator to 11.1 g.

Coating formulations comprising surface treated nanoparticles dispersed in organosilsesquioxane were prepared by slowly mixing a selected sol with a polymethylsilsesquioxane fluid or blend of fluids in a vial. Both the sol and polymethylsilsesquioxane fluid may include solvents that should evaporate as the nanocomposite coating cures on glass test surfaces or optical fibers. Preferably, coating formulations do not include dispersions displaying thixotropic behavior. The mixed formulation was concentrated by rotary evaporation to an increased solids content, expressed as wt %, to provide a viscous fluid coating composition. Further processing of the fluid coating composition included filtration using a 25 mm syringe filter at 1 µm.

Formulations containing a low molecular weight silsesquioxane resin, for example GR 650 SD cured more slowly than higher molecular weight silsesquioxanes. Nanocomposite coating dispersions containing isooctyltrimethoxysilane-treated nanoparticles exhibit thixotropic behavior in the presence of higher concentrations of the surface modifier and minimal amounts of solvent.

Coating formulations were spin-coated on glass or quartz slides and baked in an oven for approximately 20 minutes at 130° C. A spincaster (CB15 from Headway Research Inc., Garland, Tex.) was used with a Model PMW 32 controller to apply a film over two-inches square quartz slides. Spin rate and duration were chosen to provide a cured coating about 15 µm thick. After baking, the coating samples were examined for any sign of tackiness that would indicate incomplete cure. Samples were heated for an additional twenty hours to remove volatile products. Preferred cured coatings typically exhibited good adhesion to the quartz test surfaces and survived twenty hours at 130° C. without cracking or delaminating. Samples that were visually clear, or only slightly hazy, were identified for further study.

Slides coated with cured nanocomposite coatings were tested to determine their stability and transparency to radiation from an ultraviolet laser. The laser used for these studies was a continuous wave frequency doubled argon ion laser (Coherent Sabre® FreD™ Laser), operating at 244 nm. Samples were studied at various intensity levels depending on the ratio of incident power to laser spot size. Maximum laser intensity $I_{max}$ (W/cm$^2$) is computed as:

$$I_{max} = 2P_i/(\pi w_1 w_2)$$

where $P_i$ is the incident power and $w_1$ and $w_2$ are the $1/e^2$ beam radii of the Gaussian intensity profile. The transmitted power was measured by a Molectron PM 10 power probe and EPM 1500 meter, connected via GPIB interface to a computer for data collection. The percent transmission (% T) was calculated as $P_T/P_i$, where $P_T$ is transmitted power.

The total ultraviolet radiation dose required to produce a change in refractive index varies widely with the type of optical fiber device, determined by the required change in index of refraction, the type of laser, the type of fiber, and any photosensitization method used to enhance the fiber response. Doses of radiation range from several hundred Joules/cm$^2$ for low reflectivity gratings or rapid scanning technique to >10 kJ/cm$^2$ for highly reflective gratings fabricated in fibers with limited photosensitivity. While many low reflectivity gratings are written with low intensity exposure, scanning techniques typically are designed with higher ultraviolet radiation intensity. In particular, the process for writing dispersion compensation gratings involves brief exposure of the fiber to very high intensity ultraviolet radiation. Refractive index change in either the core or cladding of an optical fiber requires write-through materials that retain transparency to ultraviolet radiation for suitable periods of time and laser beam intensities.

An optical fiber coating suitable as a write-through coating will satisfy a test requirement based upon loss of radiation transmission capability with time. Coating "pass time" is the length of time before the transmission of ultraviolet radiation drops to 80% of the maximum value. The "incident dose" is calculated by multiplying the pass time by the incident intensity. In addition, the "pass dose" is calculated by multiplying the incident dose by the maximum % T. The pass dose predicts the ability to induce refractive index change in the optical fiber, since it is most closely correlated to the amount of laser energy that can be delivered through the coating to the optical fiber. In some instances, the sample transmission did not drop below the passing level for the extent of the test (300 seconds).

Examples of nanocomposite coatings use alkyltrialkoxysilane surface treated particles. Samples coated on glass or quartz slides typically contain various concentrations of nanoparticles in a fluid dispersion (see Tables 1–5) that meets requirements for viscosity and cure speed to suitably protect a glass optical fiber through the entire draw and refractive index change processes, as determined by fiber tensile to failure testing. Preferred coating dispersions provide transparent coatings having high "pass dose" values. Comparative examples containing phenylsilane surface treated colloidal silica particles had low values of "pass dose." In addition, non-surface treated nanoparticles, or fumed silica particles were either not homogeneous, not amenable to slide preparation, or demonstrated very low transmission.

Tables 1–4 indicate coating formulations applied to slides and slide testing for a variety of nanocomposite coating dispersions containing surface-treated silica or zirconia nanoparticles in polymethylsilsesquioxane. Table 5 provides comparative information for nanocomposite coatings containing zirconia (C1–C3) and those containing silica (C4 and C5). Silica containing coatings appear to consistently return higher values of pass time and pass dose.

Formulations in Tables 1–5 include concentrations of materials including organosilsesquioxanes and oxide nanoparticles expressed in terms of percent solids (% solids). The term "percent solids" refers to the weight of material remaining after removing solvent and curing a formulation expressed as a percentage of the total weight of dispersion that was coated on a substrate, e.g. an optical fiber.

Reference to Examples E5 and E7, having the same formulation, indicates the possible variability of coated samples attributable to sample preparation or differences in testing associated with exposure of coated slides to a high intensity laser beam.

TABLE 1

Silica Nanocomposite Coating Dispersions Examples E1–E4

| | E1 | E2 | E3 | E4 |
|---|---|---|---|---|
| wt % nanoparticles | 20 | 20 | 30 | 20 |
| Sol | SS1 | SS1 | SS1 | SS1 |
| Mmoles/g of nanoparticles | SM3–0.465 SM4–0.155 | SM3–0.465 SM4–0.155 | SM3–0.465 SM4–0.155 | SM3–0.465 SM4–0.155 |
| Organo-silsesquioxane | OB1 | OB1 | OB2 | OB2 |
| Solvent | S2 | S2 | S2 | S2 |
| Percent solids | 78% | 78% | 72% | 83% |
| Catalyst | No | No | No | No |
| Adheres to glass | Yes | Yes | Yes | Yes |
| Cracks | Few | None | Few | Few |
| Haze | No | No | No | No |
| Pass Time/500 W/cm$^2$ | 98 sec. | 87 sec. | 74 sec. | 66 sec. |
| Pass Time/250 W/cm$^2$ | 281 sec. | 230 sec. | 191 sec. | 258 sec. |
| Pass Dose/500 W/cm$^2$ | 40 kJ/cm$^2$ | 35 kJ/cm$^2$ | 32 kJ/cm$^2$ | 27 kJ/cm$^2$ |
| Pass Dose/250 W/cm$^2$ | 57 kJ/cm$^2$ | 48 kJ/cm$^2$ | 41 kJ/cm$^2$ | 54 kJ/cm$^2$ |

TABLE 2

Silica Nanocomposite Coating Dispersions Examples E5–E8

| Application # | E5 | E6 | E7 | E8 |
|---|---|---|---|---|
| Sol | SS2 | SS2 | SS2 | SS3 |
| wt % nanoparticles | 48.6 | 43.8 | 38.5 | 14 |
| Mmoles/g of nanoparticles | SM1–2.5 SM4 | SM1–2.5 SM4 | SM1–2.5 SM4 | SM1–2.5 SM4 |
| Organo-silsesquioxane | GR 654L | OB2 | GR 654L | GR 654L |
| Solvent | S2 | S2 | S2 | S2 |
| Percent solids | 48% | 64% | 48% | 43% |
| Catalyst | No | No | No | No |
| Adheres to glass | Yes | Yes | Yes | Yes |
| Cracks | None | None | None | None |
| Haze | No | No | No | No |
| Pass Time/500 W/cm$^2$ | 300 sec. | 95 sec. | 156 sec. | 109 sec. |
| Pass Time/250 W/cm$^2$ | 300 sec. | 240 sec. | 300 sec. | 300 sec. |
| Pass Dose/500 W/cm$^2$ | >129 kJ/cm$^2$ | 40 kJ/cm$^2$ | 68 kJ/cm$^2$ | 47 kJ/cm$^2$ |
| Pass Dose/250 W/cm$^2$ | >65 kJ/cm$^2$ | 52 kJ/cm$^2$ | >64 kJ/cm$^2$ | >64 kJ/cm$^2$ |

TABLE 3

Zirconia Nanocomposite Coating Dispersions Examples E9–E12

| Application # | E9 | E10 | E11 | E12 |
|---|---|---|---|---|
| Sol | ZS2 | ZS2 | ZS2 | ZS2 |
| wt % nanoparticles | 48.6 | 43.8 | 38.5 | 14 |
| Mmoles/g of nanoparticles | SM1–2.5 | SM1–2.5 | SM1–2.5 | SM1–2.5 |

TABLE 3-continued

Zirconia Nanocomposite Coating Dispersions Examples E9–E12

| Application # | E9 | E10 | E11 | E12 |
|---|---|---|---|---|
| Organosilsesquioxane | GR 654L | GR 654L | GR 654L | GR 654L |
| Solvent | S2 | S2 | S2 | S2 |
| Percent solids | 64% | 60% | 60% | 75% |
| Catalyst | No | No | No | No |
| Adheres to glass | Yes | Yes | Yes | Yes |
| Free from cracks | Yes | Yes | Yes | Yes |
| Haze | No | No | No | No |
| Pass Time/500 W/cm$^2$ | 4 sec. | 3 sec. | 6 sec. | 38 sec. |
| Pass Time/250 W/cm$^2$ | 22 sec. | 18 sec. | 57 sec. | >300 sec. |
| Pass Dose/500 W/cm$^2$ | 0.8 kJ/cm$^2$ | 0.5 kJ/cm$^2$ | 1.0 kJ/cm$^2$ | 12.2 kJ/cm$^2$ |
| Pass Dose/250 W/cm$^2$ | 2.9 kJ/cm$^2$ | 2.2 kJ/cm$^2$ | 5.3 kJ/cm$^2$ | >48 kJ/cm$^2$ |

TABLE 4

Zirconia Nanocomposite Coating Dispersions Examples E13–E17

| Application # | E13 | E14 | E15 | E16 | E17 |
|---|---|---|---|---|---|
| Sol | ZS3 | ZS5 | ZS4 | ZS3 | ZS8 |
| wt % nanoparticles | 30 | 30 | 30 | 32.4 | 30 |
| Mmoles/g of nanoparticles | SM1–2.0 SM2–2.0 | SM1–4.0 | SM1–2.5 | SM1–2.0 SM2–2.0 | SM6–1.0 |
| Organosilsesquioxane | GR 654L | GR 654L | GR 654L | GR 654L | GR 653L |
| Solvent | S2 | S2 | S2 | S2 | S1/S2 |
| Percent solids | 73% | 60% | 65% | 62% | 56% |
| Catalyst | Yes | No | Yes | Yes | Yes |
| Adheres to glass | Yes | Yes | Yes | Yes | Yes |
| Free from cracks | Yes | Yes | Yes | Yes | No |
| Haze | No | No | No | No | No |
| Pass Time 500 W/cm$^2$ | 14 sec. | 7 sec. | 26 sec. | 20 sec. | 22 sec. |
| Pass Time 250 W/cm$^2$ | >300 sec. | >300 sec. | >300 sec. | >300 sec. | >300 sec. |
| Pass Dose 500 W/cm$^2$ | 3.7 kJ/cm$^2$. | 1.9 kJ/cm$^2$ | 8.1 kJ/cm$^2$ | 4.9 kJ/cm$^2$ | 8.0 kJ/cm$^2$ |
| Pass Dose 250 W/cm$^2$ | >41 kJ/cm$^2$ | >46 kJ/cm$^2$ | >45 kJ/cm$^2$ | >41 kJ/cm$^2$ | >60 kJ/cm$^2$ |

TABLE 5

Comparative Examples C1–C5

| Application # | C1 | C2 | C3 | C4 | C5 |
|---|---|---|---|---|---|
| Sol | ZS1 | ZS6 | ZS7 | SS4 | SS4 |
| wt % nanoparticles | 30.4 | 28.7 | 32.1 | 20 | 30 |
| Mmoles/g of nanoparticles | SM1–1.0 | SM1–1.0 | SM1–1.0 | SM5–0.6 | SM5–0.6 |
| Organosilsesquioxane | GR 653L | GR 653L | GR 653L | GR 654L | GR 654L |
| Additive | — | D1–5 wt % | — | — | — |
| Solvent | S2/water | S1/S2 | S2 | S1 | S1 |
| Percent solids | 60% | 60% | 61% | 47% | 45% |
| Catalyst | Yes | Yes | Yes | No | No |
| Adheres to glass | Yes | Yes | Yes | Yes | Yes |
| Free from cracks | Yes | Yes | Yes | Yes | Yes |
| Haze | Yes | Slight | Slight | No | No |
| Pass time/500 W/cm$^2$ | 6 sec. | 3 sec. | 3 sec. | 9 sec. | 5 sec. |
| Pass time/250 W/cm$^2$ | 9 sec. | 6 sec. | 18 sec. | 57 sec. | 8 sec. |

The application of nanocomposite coatings to optical fibers was demonstrated using an optical fiber draw process in which an optical preform was fed into an induction furnace to be heated and drawn into a high numerical aperture germanosilicate optical fiber. A newly formed optical fiber of 125 μm diameter passed to a coating station for application of a nanocomposite coating formulation. The coating station included a coating die assembly, a curing system, a concentricity monitor, and a laser telemetric system. Coating compositions comprising a dispersion of nanoparticle filled polymethylsilsesquioxane and solvent was supplied to a coating die assembly from a pressurized container and applied, cured and measured within the primary coating station to maintain a coating thickness in a range from about 2 μm to about 10 μm on the 125 μm diameter glass fiber. Limited solvent use is desirable so that thermal energy, used in the draw process, will be consumed for curing the coating rather than evaporating solvent.

Fiber draw and coating processes were performed at a rate between about 20 meters per minute (mpm) and about 60 mpm using two thermal zones, each twenty inches long, set at elevated temperature.

One or more ultraviolet radiation-curable coatings, such as commercially available DESOLITE 3471-2-136 available from DSM Desotech (Elgin, Ill.), was applied as a secondary or outer coating over the cured nanocomposite coating during the fiber draw and cured through exposure to a Fusion Systems ultraviolet system equipped with a "D" bulb. A fully coated optical fiber element was drawn through a control capstan and onto a take-up spool for storage.

Table 6 provides results for Example E16 and Example E3. Each composition was applied at a thickness of approximately 3 μm followed by the application of a single outer coating of DESOLITE 3471-2-136. A photosensitive preform was used for the optical fiber coated with Example E16 in preparation for subsequent processing to modify the refractive index characteristics of the optical fiber.

TABLE 6

Coated Optical Fibers

| Thickness Z coat/μm | Temperature zone 1° C. | Temperature zone 2° C. | Coating Speed meters/minute | Buffer thickness μm |
|---|---|---|---|---|
| E16/2.7 | 500 | 500 | 20 | 60 |
| Si coat/μm | zone 1° C. | zone 2° C. | meters/minute | μm |
| E3/2.6 | 700 | 800 | 30 | 59 |
| E3/2.7 | 700 | 800 | 60 | 52.5 |

Preparation for modifying the refractive index properties of a previously described coated optical fiber required removal of radiation attenuating acrylate coatings. Since an oxide nanocomposite coating is substantially unaffected by common solvents, removal of an acrylate outer coating was achieved by the simple and convenient process of soaking a length of fiber in acetone for 20 to 30 minutes to cause swelling of the acrylate layer. The swollen layer was then carefully removed by hand-stripping the acrylate coating from the nanocomposite layer. As a final cleaning step the cured nanocomposite coating may be wiped using a swab soaked in isopropyl alcohol to remove acrylate material completely. Microscopic examination of the optical fiber showed no evidence of cracking of the nanocomposite layer. Also, the strength of the nanocomposite coated fiber remained high.

Bragg gratings were written in samples of nanocomposite coated optical fibers and compared to gratings written in bare glass fiber. The process used for refractive index modification included exposure to ultraviolet radiation at 244 nm. Gratings were written in the near field of a zero-order, nulled phase mask. The laser power before the phase mask was 55 mW, with a short grating length of 7 mm ($1/e^2$ diameter Gaussian apodization) by 100 microns for a peak intensity of 20 W/cm$^2$.

Gratings were written in three samples of Example 16 baked and hydrogen or deuterium loaded under conventional conditions. The grating growth rate was slower than the bare fiber example due to a combination of reduced sensitization pressure, lower germanium content in the glass, and trace absorption of the coating material. Gratings with reflectivity >99% were written through a nanocomposite coating during three minutes exposure to the ultraviolet laser. Microscope examination of the gratings showed no evidence of damage associated with exposure to ultraviolet radiation.

Dispersion compensation gratings were written in fiber coated with the nanocomposite coating of Example 16. An exemplary grating written, at 70% laser power through a nanocomposite coating, to give a dispersion of −420 ps/nm and a 1.5 nm bandwidth, showed a transmission loss of 5.5 dB. Gratings of this type have reduced optical strength compared to bare fiber due to moderate absorption of the zirconia nanocomposite coating at high laser beam intensity.

Exposure of fibers to elevated temperatures, up to 300° C. for 10 minutes showed no degradation of the coating (E16), so that the gratings can be annealed at conditions typically employed for short gratings as well as the 200° C., 20 minutes condition used for dispersion compensation gratings.

Optical fibers coated with nanocomposite coatings of Example E3 provide dispersion compensation gratings having improved characteristics compared to those written in fiber coated with the nanocomposite coating of Example E16. Several replicates of coated fibers were produced by coating Example E3 in the draw tower as described previously. As before the optical fiber was drawn to provide a high numerical aperture germano-silicate photosensitive optical fiber. After application of the silica containing nanocomposite coating, the coated fiber was deuterium-loaded prior to formation of dispersion compensation gratings having lengths from about 7 cm to about 30 cms. The fabrication of longer dispersion compensation gratings, particularly high dispersion or large bandwidth gratings, is possible using nanocomposite coatings. Table 7 shows the characteristics of dispersion compensation gratings written in optical fibers coated with silica nanocomposite coatings of Example E3. Gratings of Examples G1 and G2 were written through the ultraviolet transparent cured nanocomposite coating that was applied to the optical fiber at a coating rate of 30 meters per minute (mpm). Examples G3 and G4 used optical fibers coated at 60 mpm. Table 7 clearly shows that optical fibers, coated with silica nanocomposite coatings, gave dispersion compensation gratings having grating characteristics very similar to gratings CG1 and CG2 produced using bare optical fibers free from any potentially radiation attenuating coating. Coated and uncoated germanosilicate optical fibers were obtained from the same photosensitive preform. This confirms that silica nanocomposite coatings do not significantly weaken the intensity of the ultraviolet laser used for forming dispersion compensation gratings.

TABLE 7

Dispersion Compensation Gratings Characteristics

| Grating Example | Optical Fiber (Ge doped) | Dispersion (ps/nm) | Bandwidth (nm) | Optical Strength (db) |
|---|---|---|---|---|
| CG1 | Bare | −420 | 0.8 | 16 |
| CG2 | Bare | −420 | 0.8 | 16 |
| G1 | Coated with E3 | −420 | 0.8 | 12 |
| G2 | Coated with E3 | −420 | 0.8 | 13 |
| G3 | Coated with E3 | −420 | 0.8 | 12 |
| G4 | Coated with E3 | −420 | 0.8 | 12 |

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A coated optical fiber comprising:
   a siliceous optical fiber including a core inside a cladding; and
   a cured coating comprising:
      a thermally cured polyorganosilsesquioxane; and
      an oxide powder dispersed in said cured polyorganosilsesquioxane, wherein said oxide powder has a refractive index from about 1.2 to about 2.7 and includes a plurality of particles having a particle size less than about 100 nanometers, said cured coating having adhesion to said siliceous optical fiber and further having transparency to ultraviolet radiation.

2. The coated optical fiber of claim 1, wherein said cured coating has a refractive index.

3. The coated optical fiber of claim 2, wherein said refractive index of said cured coating is equal to the refractive index of the cladding of the siliceous optical fiber.

4. The coated optical fiber of claim 2, wherein said refractive index of said cured coating is greater than the refractive index of the cladding of the siliceous optical fiber.

5. The coated optical fiber of claim 2, wherein said refractive index of said cured coating changes from about 1.2 to about 1.7 with change in concentration of said oxide powder.

6. The coated optical fiber of claim 2, wherein said oxide powder includes at least a first oxide powder and at least a second oxide powder to provide a ratio of said at least a first oxide powder to said at least a second oxide powder, said refractive index of said cured coating changing between about 1.2 to about 1.7 with change in said ratio.

7. A fiber optic device comprising:
an optical fiber having sensitivity to radiation;
a cured coating transparent to said radiation, said cured coating comprising:
a cured polyorganosilsesquioxane; and
an oxide powder dispersed in said cured polyorganosilsesquioxane to provide said cured coating having adhesion to said optical fiber; and
a radiation induced variation of refractive index in said optical fiber produced during passage of said radiation through said cured coating to provide said fiber optic device.

8. The fiber optic device of claim 7, including a fiber optic grating selected from the group consisting of wavelength selective filters, pump stabilization gratings, dispersion compensation gratings, gain flattening filters and long period gratings.

* * * * *